United States Patent [19]

Partridge

[11] 4,315,561
[45] Feb. 16, 1982

[54] DRAIN PAN FOR RADIATORS AND COOLING SYSTEMS

[76] Inventor: Joshua J. Partridge, 4020 Harlan St., Emeryville, Calif. 94608

[21] Appl. No.: 104,009

[22] Filed: Dec. 17, 1979

[51] Int. Cl.³ .................. F16N 31/00; B65D 1/24
[52] U.S. Cl. .................. 184/106; 220/1 C; 220/22
[58] Field of Search ........... 184/106, 1.5; 220/1 C, 220/22, 90.4

[56] References Cited

U.S. PATENT DOCUMENTS

| | | | |
|---|---|---|---|
| 1,483,157 | 2/1924 | Chabbert | 184/106 UX |
| 1,554,589 | 9/1925 | Long | 184/1.5 |
| 1,568,830 | 1/1926 | Gunderson | 184/1.5 |
| 1,688,887 | 10/1928 | Spreen | 220/22 UX |
| 3,669,204 | 6/1972 | Andrews | 184/106 X |
| 3,920,144 | 11/1975 | Callen | 220/1 C X |
| 4,022,257 | 5/1977 | O'Connell | 184/106 X |
| 4,050,188 | 9/1977 | van Wingerden | 220/22 X |

*Primary Examiner*—David H. Brown
*Attorney, Agent, or Firm*—Harris Zimmerman; Howard Cohen

[57] ABSTRACT

A drain pan for radiators and cooling systems includes a base panel which is molded or otherwise formed into a coffer shape defined by upstanding side walls extendings continuously about the perimeter of the base panel. The side walls include an inwardly extending shoulder spaced slightly above the base panel to support a grid formed of a plurality of upwardly extending panels. The upstanding panels are equally spaced and oriented parallel to perpendicular axes to form a rectilinear matrix. The base panel includes concave recesses at the corners of the coffer to accommodate wheels or rollers affixed thereto.

8 Claims, 5 Drawing Figures

U.S. Patent  Feb. 16, 1982  Sheet 1 of 2  4,315,561
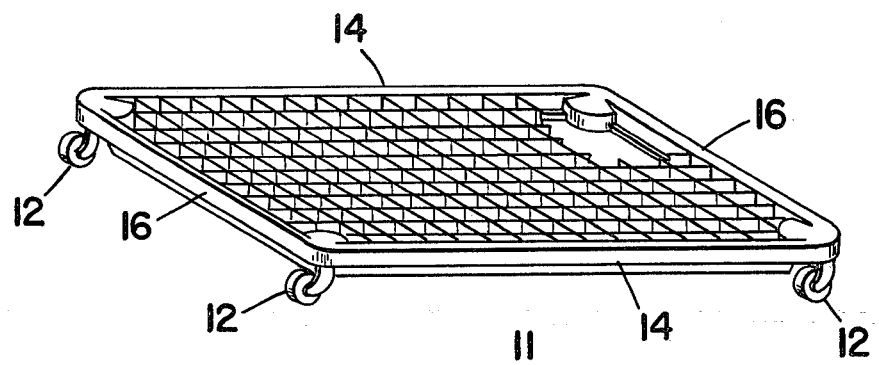
FIG_1
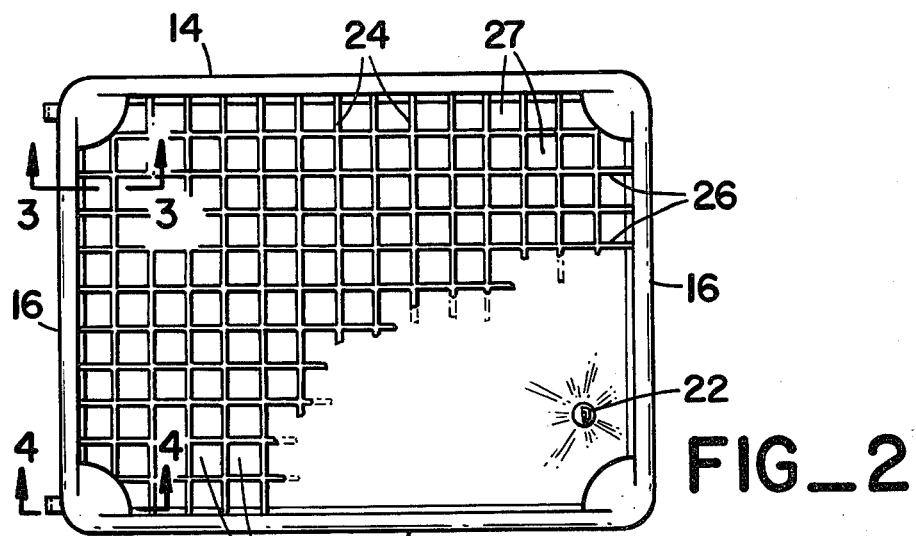
FIG_2
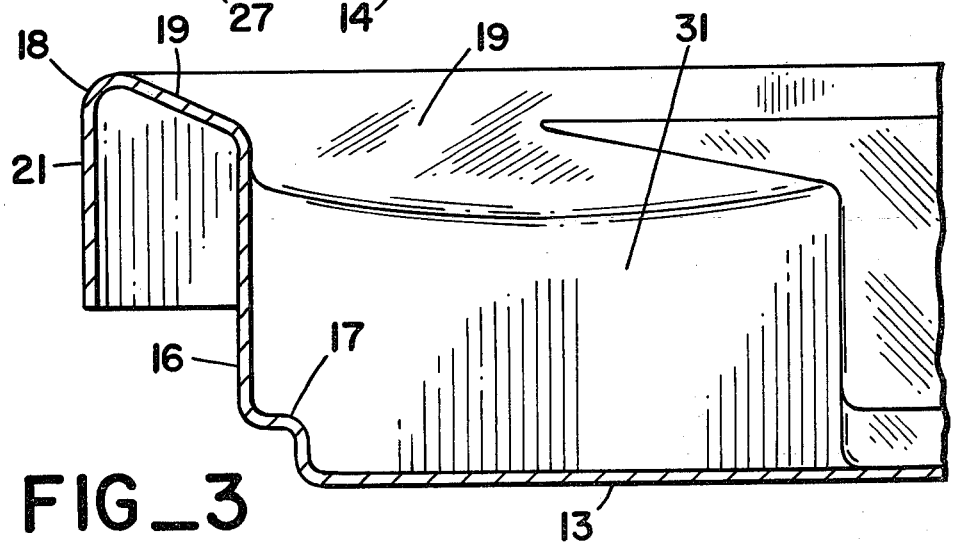
FIG_3

U.S. Patent  Feb. 16, 1982  Sheet 2 of 2  4,315,561
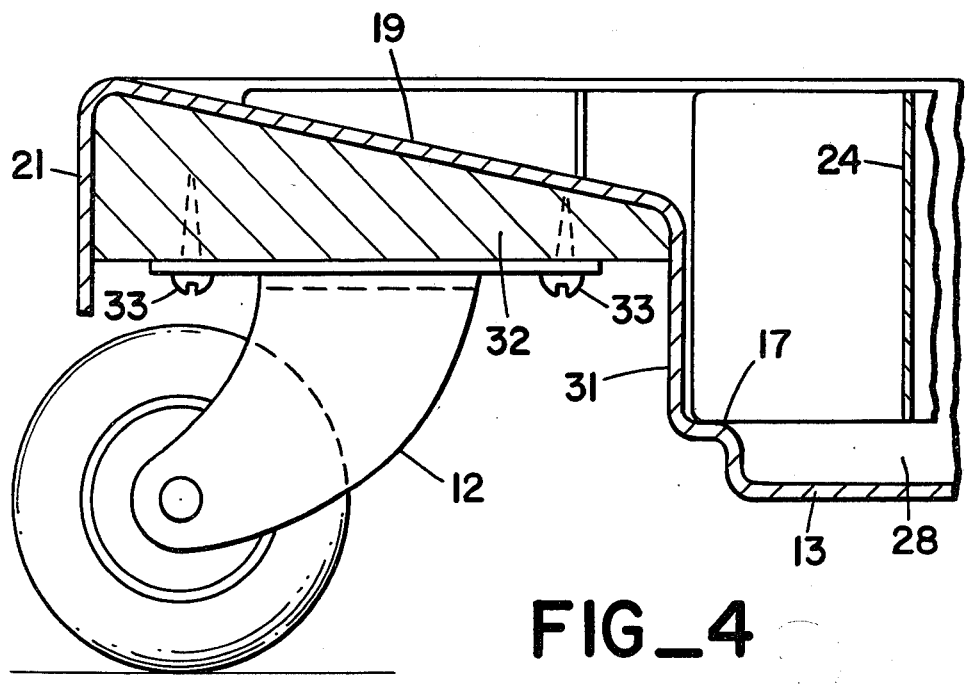
FIG_4
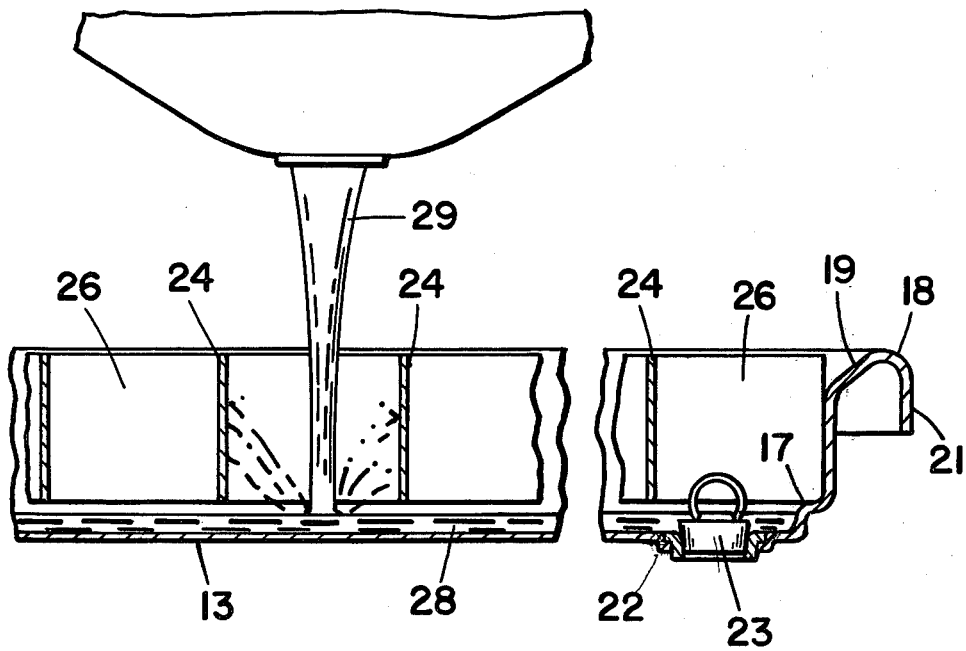
FIG_5

DRAIN PAN FOR RADIATORS AND COOLING SYSTEMS

BACKGROUND OF THE INVENTION

The following U.S. Pat. Nos. comprise the closest known prior art: 1,554,589; 3,920,144; 1,568,830; 4,054,184; 1,802,426; 4,114,664; 3,410,438.

As shown in the references cited above, there is known in the prior art a plurality of receptacles and drains for flushing automotive radiators, cooling systems, and the like. These receptacles generally comprise containers having a low height profile to enable them to be placed under a vehicle to receive and retain the effluent from the vehicle cooling system. Some of these devices include interior chambers which store the liquid, as well as drain means for disposing of the liquids in a proper manner.

In many situations in which such a device is to be used, it is important to collect all of the effluent from the cooling system without spillage, spattering, and the like. For example, professional mechanics usually try to maintain their work space in a tidy condition, for safety and convenience as well as for professional pride. Likewise, do-it-yourself auto mechanics who work at home also wish to prevent spillage of cooling system effluent, due to the fact that these liquids often contain rust and anti-freeze substances which will stain driveways and garage floors. There is an apparent deficiency in the relevant prior art, that deficiency being the lack of a drain receptacle which prevents spillage and spattering yet which is sufficiently portable to be moved from an effluent-receiving position beneath a vehicle, to a disposal position some distance away.

SUMMARY OF THE PRESENT INVENTION

The present invention generallly comprises a portable drain receptacle which is particularly adapted for receiving effluent from vehicle systems such as radiators, cooling systems, or the like. Its most salient features include a low height profile and supporting wheels or casters which permit the receptacle easily to be disposed beneath a vehicle, and to be rolled to a disposal position. The invention is also particularly adapted to prevent spattering during reception of the effluent from the vehicle, and to prevent spillage of the effluent while the receptacle is being translated to a disposal site.

The drain receptacle includes a coffer formed of a generally rectangular-based panel, and side walls formed integrally therewith and extending upwardly from the perimeter thereof. The side walls include a shoulder extending inwardly into the coffer and spaced slightly above the base panel. A salient feature of the invention is the provision of a matrix of orthogonally disposed, spaced apart panels which are supported at their distal ends by the shoulders and which extend upwardly approximately to the height of the side walls. The panels define a plurality of adjacent chambers which arrest spattering when liquid is drained into the coffer. The orthogonal panels also act to attenuate wave action in the effluent contained in the coffer, so that the receptacle may be turned, translated, or otherwise manipulated while full of liquid without spilling any of the contents.

A BRIEF DESCRIPTION OF THE DRAWING

FIG. 1 is a perspective view of the drain receptacle of the present invention.

FIG. 2 is a plan view of the drain receptacle of the present invention.

FIG. 3 is an enlarged cross-sectional elevation taken along line 3—3 of FIG. 2.

FIG. 4 is an enlarged cross-sectional elevation taken along line 4—4 of FIG. 2.

FIG. 5 is an enlarged cross-sectional elevation showing the function of the drain receptacle of the present invention.

DESCRIPTION OF THE PREFERRED EMBODIMENT

The present invention generally comprises a drain receptacle which is particularly adapted for use in draining and flushing vehicular radiators, cooling systems, and the like. As shown in FIG. 1, the drain receptacle of the present invention comprises a generally rectangular coffer 11 which is provided with a low height profile to facilitate free access for the receptacle in the low height clearance beneath vehicles. The coffer 11 is provided with wheels or casters 12 secured in subjacently depending fashion from the corners of the rectangular coffer.

With reference to FIGS. 3, 4, and 5, the coffer 11 is formed of a base panel 13 which is provided with the desired rectangular configuration. The coffer includes two pairs of opposed side walls 14 and 16 which extend in integral fashion from the perimeter of the base panel and are continuous about the perimeter. Each of the side walls 14 and 16 includes a shoulder 17 which extends inwardly into the cavity of the coffer, and which is spaced slightly above the base panel 13. The shoulder 17 extends continuously along each side wall 14 and 16.

Each of the side walls 14 and 16 also includes a lip 18 extending outwardly from the distal edge thereof. The lip 18 includes an oblique portion 19 extending upwardly and outwardly from the distal edge of the side wall, as well as a depending portion 21 which extends generally parallel to the side wall and is spaced outwardly therefrom. The oblique portion 19 is provided to aid in catching drips, spatters, and effluent, and also act to deter spillage caused by wave motion in the liquid retained in the coffer. The depending portion 21 adds strength to the outer rim of the device 11, and also forms a convenient handhold to faciliate manipulation of the receptacle.

With reference to FIG. 5, the base panel 13 is provided with a drain hole 22, as is also shown in FIG. 2. The drain hole 22 includes a plug 23 which is selectively removable to permit disposal of effluent collected in the receptacle 11.

A salient feature of the present invention is the provision of a matrix or lattice of panels 24 and 26 disposed in orthogonal relationship and received within the cavity of the coffer. The panels 24 and 26 extend upwardly, and are supported at their distal ends by the inwardly extending shoulders 17 of the side walls 14 and 16. The height of the panels is substantially equal to the distance between the shoulder 17 and the upper extent of the lip 18 of the side wall.

It may be noted that the lattice arrangement of the orthogonally related panels 24 and 26 defines a plurality of rectangular chambers 27 which are open at their upper and lower ends. The lower ends of the chambers 27 are in open flow communication with the generally flat flow space 28 extending between the base panel 13 and the lower edge of the lattice. The flat flow space 28 permits the liquid retained in the coffer 11 to achieve a common liquid level among all of the chambers 27.

With reference to FIG. 5, the chambers 27 serve to prevent spattering which may otherwise occur when a stream of effluent 29 is directed into the coffer. The spatters and flying droplets which are created as the stream 29 strikes the base panel 13 or the liquid surface thereabove are attenuated and arrested by the upwardly extending surfaces of the panels 24 and 26. These flying droplets might otherwise attain sufficient velocity and trajectory to soil the surrounding workspace.

Another important function served by the lattice of panel 24 and 26 is the attenuation of wave motion in the liquid entrained in the coffer 11. As is known in the prior art, shallow drain pans which are substantially full of liquid are difficult to translate laterally, due to the fact that any slight motion of the drain pan will cause sufficient wave action in the liquid stored therein to cause spillage over the sides of the drain pan. However, in the present invention, any significant amount of liquid retained in the coffer 11 will have a surface level disposed between the upper and lower extents of the panels 24 and 26. Due to the fact that wave motion is substantially a surface phenomenon, any wave front established in the liquid will almost immediately impinge upon the vertical surfaces of the walls 24 and 26, and be attenuated. As a result, the lattice prevents propagation of wave fronts across the surface of the liquid retained within the receptacle of the present invention. The outstanding benefit of this feature is that the receptacle 11 may be translated laterally; for example, the receptacle may be translated from a position beneath a vehicle to a disposal site with little or no risk of creating sufficient wave motion to cause spillage from the receptacle. Of course the wheels or casters 12 aid in this effect by providing smooth lateral translation of the receptacle.

With reference to FIGS. 3 and 4, the present invention provides concave recesses at the corners of the coffer 11 in which the wheels or casters 12 are secured. A concave panel 31 extends between the converging side walls 14 and 16 adjacent to their apex at a corner of the coffer 11. The oblique portion 19 of the lip 18 of the side walls extends at a shallower angle and is broader in width at this point in the structure. In the recess formed by the concave wall 31, the broad oblique panel, and the out depending portion of the lip 21, a block 32 is secured. Screws 33 or the like are received in the block 32 to secure the wheel or caster 12.

To employ the receptacle of the present invention, it is first rolled beneath a vehicle and disposed to receive effluent from a radiator, cooling system, or the like. The vehicle system has been opened to permit drainage therefrom, and the drain receptacle fills with the effluent from the vehicle's system. When the vehicle system is completely drained, it is re-sealed, and the drain receptacle is rolled from its position beneath the vehicle. At this point the drain receptacle may be rolled or otherwise transported to a disposal site where the plug 23 is removed from the drain hole 22, and the contents of the receptacle are released. Of course, the receptacle may be reused indefinitely.

I claim:

1. A drain receptacle for receiving effluent from a vehicle, comprising a pan having a base panel, a plurality of side walls extending upwardly from the perimeter of said base panel and formed integrally therewith, said side walls extending continuously about said base panel and defining therewith an upwardly opening coffer, at least one of said side walls including a shoulder extending into said coffer and disposed in longitudinal fashion along said side wall, lattice means disposed in said coffer for attenuating and arresting wave motion in and spattering from liquid contained in said coffer, said lattice means including at least one edge impinging on and supported by said shoulder, said base panel including a plurality of corners and a plurality of upwardly extending concave wall members, each disposed at one of said corners and extending between the sidewalls converging thereat.

2. The drain receptacle of claim 1, wherein said lattice means includes a plurality of upwardly extending panels disposed in spaced apart, intersecting fashion, said upwardly extending panels being substantially equal in height to said sidewalls.

3. The drain receptacle of claim 1, wherein each of said concave wall members defines a corner recess, and further including a plurality of wheel assemblies, each secured in subjacently depending fashion in one of said corner recesses.

4. The drain receptacle of claim 1, wherein said base panel includes a resealable drain port extending therethrough.

5. The drain receptacle of claim 1, wherein said shoulder extends continuously about all of said side walls and supports a plurality of edges of said lattice means.

6. The drain receptacle of claim 5, wherein said shoulder is spaced closely and superjacently with respect to said base panel to define a narrow, laterally extending open flow space between said base panel and the lower edge of said lattice means.

7. The drain receptacle of claim 1, wherein each of said sidewalls includes a lip at the upper distal portion thereof, said lip extending obliquely upwardly and outwardly from said sidewall.

8. The drain receptacle of claim 2, wherein said lip also includes a subjacently depending portion extending substantially parallel to said side wall.

* * * * *